US005361059A

United States Patent [19]

Hoffman et al.

[11] Patent Number: 5,361,059

[45] Date of Patent: Nov. 1, 1994

[54] METHOD AND APPARATUS FOR MODIFYING THE FUNCTIONALITY OF A GAUGE

[75] Inventors: John P. Hoffman, Peoria; Ricky D. Vance, Washington; Dennis A. Barney, Morton; Joseph G. Kozlevcar, Peoria, all of Ill.

[73] Assignee: Caterpillar Inc., Peoria, Ill.

[21] Appl. No.: 150,754

[22] Filed: Nov. 12, 1993

Related U.S. Application Data

[63] Continuation of Ser. No. 945,469, Sep. 16, 1992, abandoned.

[51] Int. Cl.[5] .................... B60Q 1/00

[52] U.S. Cl. .................... 340/438; 340/461; 340/462; 340/525; 73/866.3

[58] Field of Search .................... 340/459, 461, 462, 525, 340/508, 450, 450.2, 450.3, 612; 364/146, 424.03, 424.04, 424.06, 424.07, 431.01; 73/290 R, 293, 291, 307, 866.3

[56] References Cited

U.S. PATENT DOCUMENTS

| | | | |
|---|---|---|---|
| 3,516,063 | 6/1970 | Arkin et al. | 340/163 |
| 4,223,302 | 9/1980 | Hocking | 340/525 |
| 4,551,801 | 11/1985 | Sokol | 364/424 |
| 4,862,395 | 8/1989 | Fey et al. | 364/561 |
| 4,926,331 | 5/1990 | Windle et al. | 364/424.04 |
| 4,967,143 | 10/1990 | Raviglione et al. | 324/73.1 |
| 4,975,848 | 12/1990 | Abe et al. | 364/424.03 |
| 4,977,389 | 12/1990 | Shiraishi | 340/461 |
| 5,034,889 | 7/1991 | Abe | 364/424.04 |
| 5,050,080 | 9/1991 | Abe | 364/424.04 |
| 5,091,858 | 2/1992 | Paielli | 364/431.12 |
| 5,157,610 | 10/1992 | Asano et al. | 364/424.03 |
| 5,214,582 | 5/1993 | Gray | 364/424.03 |
| 5,257,190 | 10/1993 | Crane | 364/424.03 |

OTHER PUBLICATIONS

Caterpillar Service Manual—"Systems Operation Testing and Adjusting-Computerized Monitoring System with Liquid Crystal Display" published Oct. 1990.

Journal Article entitled "Introducing The Vital Signs Monitor, Plus Load Weighing System", of Marathon LeTourneau believed to have been published Jan. 1987.

*Primary Examiner*—Donnie L. Crosland
*Attorney, Agent, or Firm*—Steven R. Janda

[57] ABSTRACT

Gauges for indicating the level of sensed parameters are often provided in connection with a variety of machines. Advantageously, such gauges are sufficiently flexible to indicate the level of a parameter having a warning level that is dependent upon the level of a second sensed parameter. In the subject invention, a gauge indicates the level of a primary sensed parameter having a normal operating range. A sensor produces a signal indicative of the level of a secondary sensed parameter and the levels of the primary sensed parameter associated with the normal operating range are modified in response to the level of the secondary sensed parameter.

10 Claims, 5 Drawing Sheets

METHOD AND APPARATUS FOR MODIFYING THE FUNCTIONALITY OF A GAUGE

This is a continuation of application Ser. No. 07/945/469, filed Sep. 16, 1992, now abandoned.

DESCRIPTION

1. Technical Field

The invention relates generally to displaying the level of a sensed parameter on a machine and, more particularly, to a method and apparatus for displaying the level of a primary sensed parameter having a warning level that is dependent on the level of a second sensed parameter.

2. Background Art

In a variety of engine-powered vehicles, monitoring and diagnostic devices are employed to detect the presence of various undesirable operating conditions, such as overheating of the engine, low oil pressure, low fuel, and the like, and indicators are provided to warn the operator of such conditions. These instruments are typically connected to various sensors and switches for monitoring or controlling conditions on the vehicle via a wire harness and/or a communication link. In many applications, these instruments are also connected to electronic control systems, for example electronic engine controls, electronic transmission controls, and the like.

Most prior art systems have included dedicated instruments in which the functions and conditions of the vehicle to be monitored or diagnosed, as well as the particular sensors provided on the vehicle, are identified in advance. Therefore, the instruments are specifically designed for and hence "dedicated" to the monitoring or diagnosing of those particular vehicle functions and conditions in response to signals from pre-identified sensors. Accordingly, such "dedicated" instruments generally cannot be readily modified to accommodate different machines, different sensors and/or different conditions and functions. Rather, such instruments are generally limited to use with a particular vehicle type or model for which the instrument has been designed.

However, it is advantageous for these instruments to be usable in connection with many different machines. Lower costs are achieved and less warehousing space is required if a single instrument is manufactured that can be used in many different applications. Similarly, service time is reduced if software changes are avoided when an instrument is moved from one machine to another.

Some prior art systems have provided for standardized monitoring systems that are usable in connection with a variety of machines, for example the system shown in Sokol U.S. Pat. No. 4,551,801 issued on Nov. 5, 1985. While being an improvement over dedicated systems, this monitoring system is still relatively inflexible and requires the addition or subtraction of monitoring modules and the use of decals to indicate the parameters being shown by each display module.

An additional area of desired flexibility is to provide one or more gauges being capable of indicating the level of a sensed parameter having a warning level that is dependent upon the level of a second sensed parameter. For example, the warning level for engine oil pressure may be dependent upon engine speed. Typically, prior art systems have provided gauges having only a fixed warning level at which the operator is informed that a warning condition exists. Such an indication is typically accompanied by flashing or illuminating a warning light or sounding an audible alarm.

One prior art system, described in literature published by the Marathon LeTourneau Company in 1987 and entitled "Introducing the Vital Signs Monitor, plus Load Weighing System," included a device for indicating a warning condition for a sensed parameter having a warning level dependent upon the level of a second sensed parameter. However, the disclosed system displays the warning condition in an alphanumeric format and only alters the warning level.

Since the disclosed system does not include a gauge, the scaling of any gauge provided to indicate the primary parameter level when in the normal operating range remains unchanged as the level of the secondary parameter increases or decreases. Therefore, the indicated level would increase or decrease as the level of the secondary parameter changed. Any gauge provided separately from the disclosed system would indicate the level of the parameter with respect to an arbitrary range and not with respect to the actual warning level that changes as the level of the secondary sensed parameter changes. Furthermore, the warning is displayed on a device separate from any gauge displaying the parameter level.

The present invention is directed to overcoming one or more of the problems set forth above.

DISCLOSURE OF THE INVENTION

The invention avoids the disadvantages of known monitoring systems and provides a flexible gauge for indicating the level of a sensed parameter having a warning level that is dependent upon the level of a second sensed parameter.

In one aspect of the invention, an apparatus for indicating a warning level on a vehicle having an instrument panel is provided. A gauge indicates levels of a primary sensed parameter having a normal operating range. A device senses a level of a secondary sensed parameter and a control device modifies the levels of the primary sensed parameter associated with the normal operating range in response to the level of the secondary sensed parameter.

In another aspect of the invention, a method for indicating a warning level on a vehicle having an instrument panel is provided. The method includes the steps of indicating levels of a primary sensed parameter having a normal operating range on a gauge; sensing a level of a secondary sensed parameter; and modifying the levels of the primary sensed parameter associated with the normal operating range of the gauge in response to the level of the secondary sensed parameter.

The invention also includes other features and advantages which will become apparent from a more detailed study of the drawings and specification.

BRIEF DESCRIPTION OF THE DRAWINGS

For a better understanding of the present invention, reference may be made to the accompanying drawings in which.

BEST MODE FOR CARRYING OUT THE INVENTION

Figure 1:
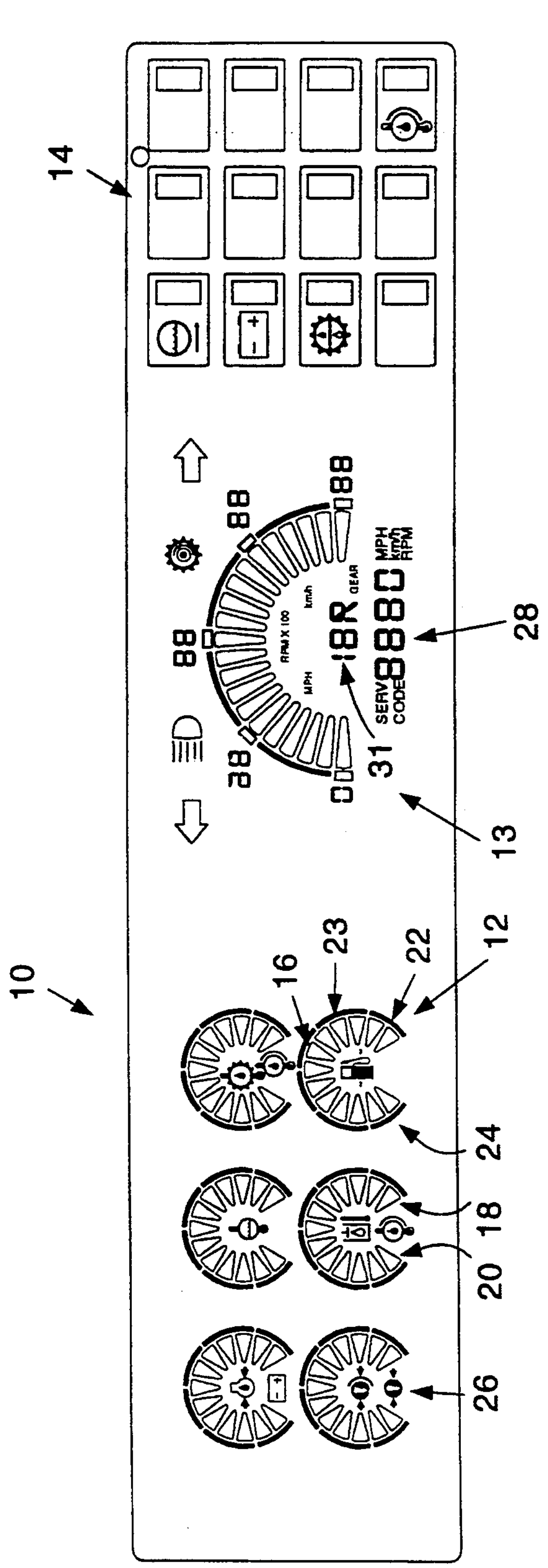
FIG. 1 is an illustration of a computerized diagnostic and monitoring system.

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 includes a plurality of indicator lights 14, preferably LEDs, and a plurality of electronic gauges 12 having a plurality of illuminable segments, preferably of the vacuum fluorescent (VF) type. Alternatively, the gauges 12 could be electromechanical in design. The gauges 12 preferably indicate the level of a plurality of sensed parameters, for example, ground speed, engine RPM, oil temperature, fuel level, transmission oil temperature, and the like, and may be used in connection with any of a plurality of different machine types. In the preferred embodiment, one of the gauges 12 is a speedo/tacho gauge 13 that displays either the speed of the vehicle or the RPM of the engine or transmission and includes scaling digits for displaying the magnitude of the sensed parameter at various points along the speedo/tacho gauge 13.

Warning conditions are brought to an operator's attention by the indicator lights 14, a flashing gauge, a flashing alarm lamp, and/or a horn. Advantageously, the indicator lights 14 are lit in response to switch-type inputs being in a fault or warning condition. The instrument 10 also advantageously includes displays for indicating such things as turn signal operation, hi-beam light operation, retarder operation, and transmission gear. The instrument 10 is advantageously microprocessor based and functions in response to internal software.

The instrument 10 illustrated in FIG. 1 is sufficiently flexible to be used in connection with a number of different machines and to indicate a number of different parameters. For example, each gauge, except the central gauge indicating speedo/tacho information, is capable of indicating either a high warning condition or a low warning condition.

Each of the gauges 12 displays the level of a parameter. A primary parameter sensor 32 produces a signal representative of the level of the parameter to be indicated on each gauge and having its identity indicated by a symbol 26 on each gauge. The functionality of one or more of the gauges 12 is also affected by the level of a second parameter being sensed by a secondary parameter sensor 33 as described below. The primary and secondary parameter sensors 32,33 are typically pulse-width modulated type sensors, frequency based sensors, or the like.

In some embodiments, the secondary parameter sensor 33 for one gauge may be the primary parameter sensor 32 for another gauge 12. For example, if the oil pressure gauge is affected by engine RPM and the speedo/tacho gauge 13 is indicating tachometer information, then the sensor reading engine RPM is the primary parameter sensor 32 for the speedo/tacho gauge 13 and is the secondary parameter sensor 33 for the oil pressure gauge.

Each of the gauges 12 other than the speedo/tacho gauge 13 includes a plurality of indicating segments 16, high warning segments 18, and low warning segments 20. However, a single high or low warning segment 18,20 may be used. The high warning segments 18 are advantageously located in the most clockwise position on the gauge 12 and the low warning segments are located in the most counter-clockwise position on the gauge 12. When a gauge indicates the level of a parameter for which it is advantageous to indicate a warning when the parameter exceeds a certain level, for example engine temperature, the high warning segments 18 are enabled. To display the level of parameter for which it is advantageous to indicate a warning when the parameter is below a certain level, for example fuel level, the low warning segments 20 are enabled. In some cases, it is advantageous to indicate both high and low warning conditions.

Advantageously, the each gauge 12 also includes a high outline segment 22, central outline segments 23, and a low outline segment 24, all of which being located around the periphery of each gauge and being illuminable. The outline segments 22,23,24 are also preferably of the VF type. The high outline segment 22 is located adjacent the high warning segments 18 and the low outline segment 24 is located adjacent the low warning segments 20. The central outline segments 23 are located between the high and low outline segments 22,24. The central outline segments 23 are illuminated in response to the gauge 12 being used to indicate the level of a sensed parameter. In response to a parameter having a high warning value being indicated, the high outline segment 22 is illuminated; and in response to a parameter having a low warning value being indicated, the low outline segment 20 is illuminated. Thus, the appearance of the gauge 12 indicates that the displayed parameter has either a high or low warning level and better informs the operator that the level of the sensed parameter is approaching a warning level.

In the preferred embodiment, the high and low warning segments 18,20 are colored differently than the indicating segments 16; and the high and low outline segments 22,24 are colored differently from the central outline segments 23 and similarly to the high and low warning segments 18,20. Advantageously, the high and low warning segments 18,20 and high and low outline segments 22,24 are red and the indicating segments 16 and central outline segments 23 are blue-green. However, the low warning segments 20 and low outline segment 24 for the gauge 12 indicating fuel level are preferably yellow.

One or more of the gauges include a plurality of illuminable symbols 26 to identify the parameter being indicated while the remaining gauges include only a single symbol 26. The symbols 26 are advantageously selected from the symbols approved by ISO for indicating the parameters of interest. One of the symbols 26 is illuminated in connection with each gauge 12 so that the operator can identify the indicated parameter. Thus, the gauge 12 is capable of indicating the level of one of two or more different parameters by illuminating one of the symbols 26. The parameter, and hence symbol 26, selected for each gauge 12 depends on the vehicle to which the instrument 10 is connected and choices made by the vehicle and system designers.

A digital display 28 is included to indicate either speedometer or tachometer information in digital form. In the preferred embodiment, one of the speedo/tacho gauge 13 and digital display 28 indicates speedometer information while the other indicates tachometer information; however, either speedometer or tachometer information may be indicated on both if so desired. Advantageously, the digital display 28 is also adapted to indicate the level of other parameters when the instrument 10 is operating in a numeric readout mode or diagnostic information when the instrument 10 is operating in diagnostic modes.

Advantageously, the gauges 12 are capable of displaying the parameter values in a plurality of display modes, including a single-bar mode and a fill-the-graph mode. In the single-bar mode, only one of the indicating segments 16 is illuminated when the level of the sensed parameter is within the normal operating range. Thus, the appearance of the gauge 12 simulates the appearance of a mechanical gauge. In the fill-the-graph mode, the level of the sensed parameter is indicated by illuminating a plurality of indicating segments 16 such that the appearance of the gauge 12 simulates a bar graph.

Figure 2:
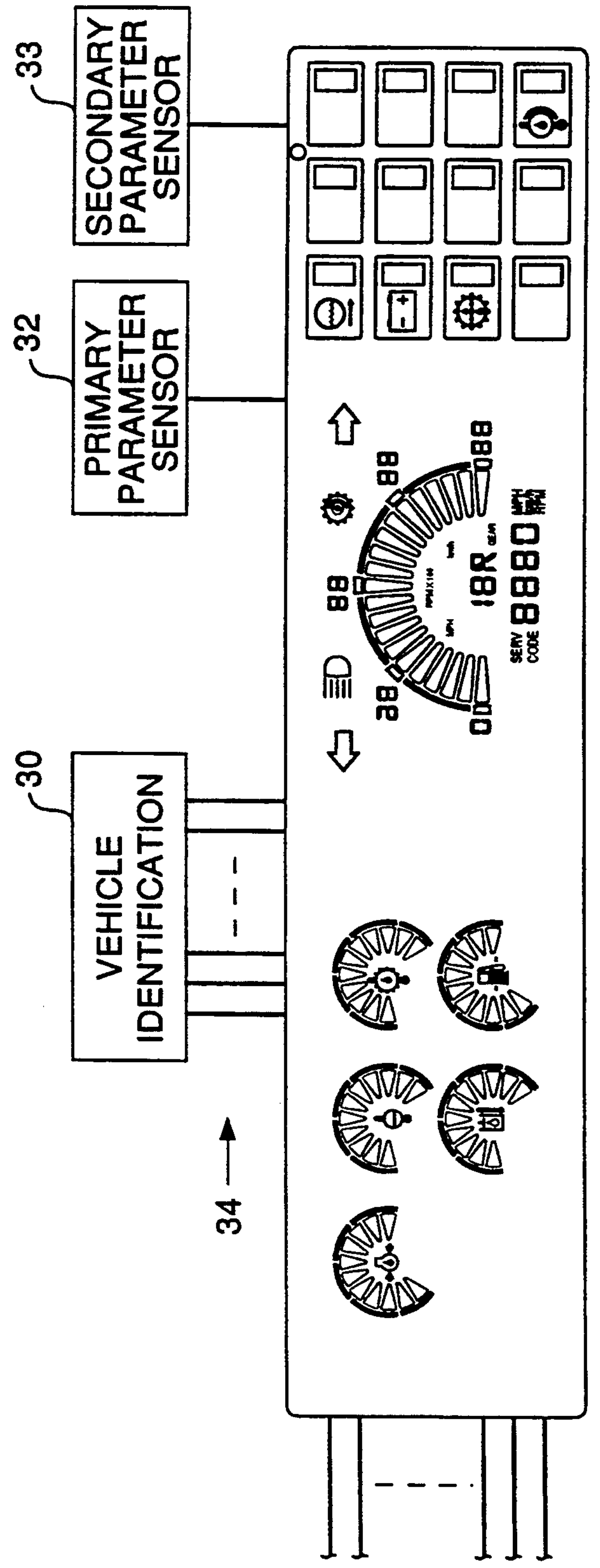
FIG. 2 is an illustration of a computerized diagnostic and monitoring system having a plurality of inputs used in connection with a preferred embodiment of the invention.

As shown in FIG. 2, the instrument 10 selects a group of gauges and a display format for each parameter to be indicated on the machine type of interest. Advantageously, each machine type has an identification code to be delivered to the instrument 10 which responsively reconfigures itself in response to the format chosen by the designer for that machine. In response to the identification code, the instrument determines the parameter monitored at each input from the wire harness, the parameter to be displayed on each gauge, the status report level for each input, the gauges to be used, the signal filtering, debounce, scaling, or averaging characteristics associated with each input, and the functional relationship between each parameter value and the gauge reading. One of the symbols 26, the central outline segments 23, and one of the high and low outline segments 22,24 are illuminated for each gauge 12 to be used in response to the identification code. Likewise, the switch-type input associated with each indicator light 14 is defined for each machine type on which the instrument 10 is used in response to the identification code.

An identification means 30 produces the identification code. In the preferred embodiment, the identification means 30 is connected to the instrument 10 via one or more identification lines 34 forming part of the wire harness and carrying the identification code.

In the preferred embodiment, the identification code is in the form of binary signals produced by connecting each of the identification lines 34 to a ground input potential or allowing the voltage of the identification line to float in response to any voltage to which the identification line 34 is connected. In the preferred embodiment, the identification means 30 directly connects the identification lines 34 to a terminal having one of the above described voltage characteristics; however, it should be appreciated that the identification lines 34 could be connected to a switch-type device for connection to a ground input potential or a floating terminal. While the preferred embodiment of the invention is described in connection with a ground input potential and a floating condition, it should be appreciated that the particular states of the binary signals could be modified without deviating from the spirit of the invention.

The instrument 10 is connected to each of a plurality of sensors by wire. When used in connection with some machine types, the instrument 10 is also connected to one or more electronic controls via a communication link. In the preferred embodiment, the communication link is a two-way serial communication link on which the instrument 10 can both transmit and receive information. Preferably, the instrument 10 builds a serial data series (message) including a module identifier corresponding to the electronic control to receive the data, an identifier for each scaled parameter to be transmitted over the communication link, the scaled data representing the level of the parameter associated with each identifier, and the status of one or more of the switch-type inputs. Once the message is built, the instrument 10 transmits the message over the communication link.

Figure 3A:
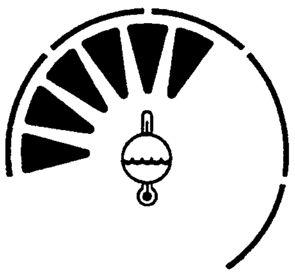
FIG. 3*a* illustrates a gauge indicating the level of a parameter in the normal operating range and being of a type for indicating a high warning condition.
Figure 3B:
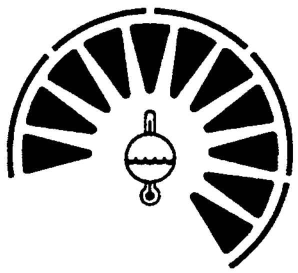
FIGS. 3*b* and 3*c* illustrate gauges indicating high warning conditions in accordance with the present invention.
Figure 3C:
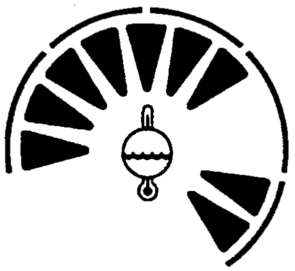

Referring now to FIGS. 3*a*–3*f*, the operation of the gauges 12 is described. As shown in FIGS. 3*a*, 3*b*, and 3*c*, to indicate the level of a parameter for which it is advantageous to indicate a warning when the parameter exceeds a certain level, for example engine coolant temperature, the high warning segments 20 are enabled, the high outline segment 22 is illuminated, and the indicating segments 16 are progressively illuminated in the clockwise direction as the sensed parameter increases from a low level to a maximum warning level. FIG. 3*a* illustrates a parameter for which it is desirable to indicate a high warning condition and being within the normal operating range.

Figure 3D:
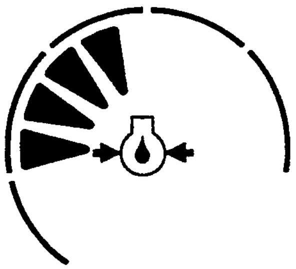
FIG. 3*d* illustrates a gauge indicating the level of a parameter in the normal operating range and being of a type for indicating a low warning condition.
Figure 3E:
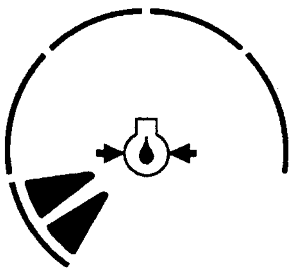
FIGS. 3*e* and 3*f* illustrate gauges indicating low warning conditions in accordance with the present invention.
Figure 3F:
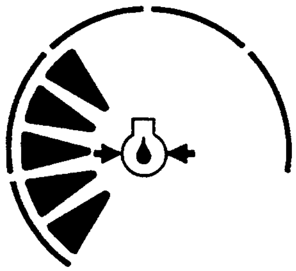

As shown in FIGS. 3*d*, 3*e*, and 3*f*, to indicate a warning when the parameter is below a certain level, for example engine oil pressure, the low warning segments 18 are enabled and the low outline segment 24 is illuminated. The indicating segments 16 are illuminated to indicate the sensed parameter being at a high level and progressively turned off in the counter-clockwise direction as the level of the sensed parameter decreases. FIG. 3*d* illustrates a parameter for which it is desirable to indicate a low warning condition and being within the normal operating range.

For each parameter level being displayed on the gauge 12, a high or a low warning value is established. In one embodiment, both the warning level and the scale associated with the indicating segments 16 are changed in response to the level of the second sensed parameter. For example, if the gauge is indicating a primary parameter level and the level of the second parameter changes, the gauge indication will change if the level of the primary parameter has remained unchanged.

The primary and secondary parameters are advantageously chosen to be complementary, i.e. a change in one parameter typically accompanies a change in the other. Thus the scaling changes caused by changes in the level of the second parameter can be selected to offset any corresponding changes in the level of the primary parameter. In this way, the gauge indication is less affected by changes in the level of the second parameter. The gauge therefore indicates the relative difference between the current level of the primary sensed parameter with respect to the actual warning level rather than an arbitrarily chosen warning level.

For example, if engine oil pressure typically increases as engine RPM increases, then the normal operating range for oil pressure is shifted upwardly in response to increases in engine RPM. The scaling changes occurring in response to engine RPM are selected such that when the gauge is indicating approximately half scale, the gauge is indicating that the oil pressure level is in substantially the middle of the normal operating range associated with the current engine RPM level. Similarly, a high or low gauge reading indicates that the primary parameter level is high or low in the normal operating range associated with the current engine RPM level.

In a second embodiment, the scale associated with the indicating segments 16 are unchanged but the warning level is modified in response to the level of the second sensed parameter. In this case the indicating segments 16 display the level of the primary sensed parameter with respect to an arbitrary range of values. Thus, in the case of a high warning style gauge, the gauge may indicate a warning condition even though less than the full number of indicating segments 16 are illuminated or flashed. In the case of a low warning style gauge, the gauge may indicate a warning condition even though some of the indicating segments 16 are illuminated or flashed.

In the embodiment in which the gauge scaling is changed, the warning levels are indicated as follows. For high warning style gauges in the fill-the-graph mode, the high warning value corresponds to all of the indicating segments 16 being illuminated. Once the level of the sensed parameter exceeds the high warning value, all of the indicating segments 16, the central and high outline segments 22,23, the symbol 26, and one of the high warning segments 18 are caused to flash. As the level of the sensed parameter increases even farther, the second of the high warning segments 18 is also caused to flash. As shown in FIG. 3*b*, the sensed parameter has increased to a level at which all of the indicating segments 16, the symbol 26, the central and high outline segments 22,23, and both of the high warning segments 18 are all caused to flash.

For low warning style gauges in the fill-the-graph mode, the low warning value corresponds to all of the indicating segments 16 being turned off. Once the level of the sensed parameter decreases below the low warning value, the central and low outline segments 23,24, the symbol 26, and one of the low warning segments 20 are caused to flash. As the level of the sensed parameter decreases even farther, the second of the low warning segments 20 is also caused to flash. As shown in FIG. 3*e*, the sensed parameter has decreased to a level at which the central and low outline segments 23,24, the symbol 26, and both of the low warning segments 20 are all caused to flash.

In the embodiment in which the scale of the gauge is not changed, the warning conditions are indicated as follows. If the level of the primary sensed parameter exceeds the high warning level, the number of indicating segments 16 corresponding to that level of the primary sensed parameter in the arbitrary range are caused to flash along with either the two high or the two low warning segments depending on whether the gauge is a high or low warning style gauge.

FIG. 3*c* illustrates a warning condition for a high warning style gauge in which the high warning level has been adjusted downwardly in response to the second sensed parameter to a point less than the full scale of the arbitrary range associated with the indicating segments 16. FIG. 3*f* illustrates a warning condition for a low warning style gauge in which the low warning level has been adjusted upwardly in response to the second sensed parameter to a point greater than the lowest portion of the arbitrary range associated with the indicating segments 16.

Both embodiments of the invention may also be practiced when the gauges 12 are in the single-bar mode. In the embodiment in which the gauge scaling is changed, only a single segment is illuminated or flashed when the gauge is indicating in the normal operating range or in the high or low warning range. In the embodiment in which the gauge scaling is not changed, one of the indicating segments and both of the high or low warning segments are flashed when the gauge is in the high or low warning range and the high and low warning values do not correspond to the maximum and minimum levels, respectively, capable of being indicated by the indicating segments 16.

In addition to the above warning indications, the warning horn or the alarm lamp (neither of which are shown) may be activated when the level of the sensed parameter exceeds the high or low warning value.

Referring back to FIG. 1, a gear display 31 is advantageously disposed adjacent the digital display 28. The gear display 31 indicates the number and direction, i.e. forward, neutral, or reverse, of the vehicle transmission.

The indicator lights 14 indicate various system faults or warning conditions. In the preferred embodiment, one or more of the indicator lights 14 are associated with warning conditions of parameters indicated by the gauges 12.

The instrument 10 preferably performs some processing of signals received from the sensors over the wire harness and scales the signals received from pulse-width modulated type sensors and frequency based sensors in manners well-known in the art.

Similarly, the instrument 10 receives signals from the switch-type sensors. The signals associated with these inputs are received by the instrument 10, but generally no scaling is required.

In response to the switch-type inputs, the instrument 10 determines whether and which indicator lights 14 should be illuminated in a manner well-known in the art. For example, if a particular switch-type input indicates that the switch-type sensor has been activated in response to a fault condition, warning condition, or the like, the indicator light 14 associated with that sensor is illuminated.

Figure 4:
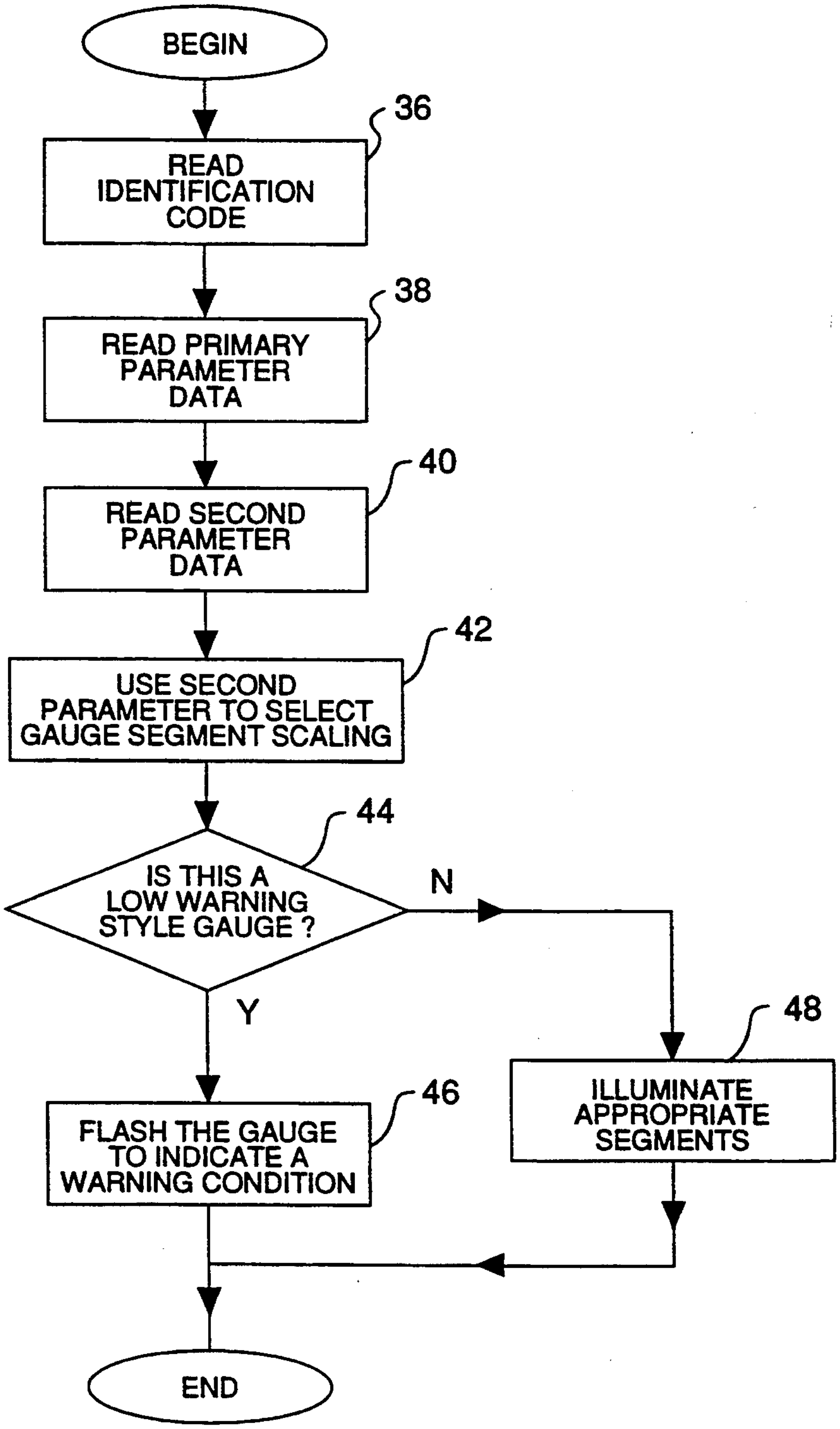
FIG. 4 illustrates a flow chart of an algorithm used in connection with a preferred embodiment of the invention.

In the preferred embodiment, the instrument 10 executes the algorithm illustrated in FIG. 4. The instrument 10 reads 36 the identification code from the identification means 30 and, for each of the gauges other than the speedo/tacho gauge 13, determines 34 whether the gauge is a high or low warning style gauge. Advantageously, this is determined by retrieving a gauge style identifier from a memory device (not shown) within the instrument 10 for each gauge to be used. The gauge style identifier is retrieved from the memory device in response to the identification code. Each of the gauge style identifiers is selected in response to choices made by the vehicle designers regarding which parameters are to be displayed and the preferred display format for each parameter.

If the gauge is a low warning style gauge, the central and low outline segments 23,24 are illuminated and the low warning segments 20 are enabled. If the gauge is a high warning style gauge, the central and high outline segments 23 are illuminated and the high warning segments 18 are enabled.

The instrument 10 reads 38 the primary sensor signals from the wire harness. Since the sensor signals may be in the form of pulse-width modulated signals, frequency signals, or switch-type binary signals, the instrument 10 converts and scales the inputs to a microprocessor readable form in manners well-known in the art. For example, if the output from one of the pulse-width modulated sensors is sensing oil pressure and has a duty cycle of 70% and the range of the scaled signal is from 0–255, the binary number 179 is assigned to the oil pressure parameter. Similarly, the instrument 10 reads 40 the secondary sensor signal.

In response to the scaled signal from the pulse-width modulated and frequency sensors, the instrument 10 determines which segments are to be illuminated on each gauge. In the preferred embodiment, the memory device (not shown) includes a plurality of stored parameter values corresponding to each possible magnitude of the scaled data for each sensed parameter in a look-up table of a type well-known in the art. The instrument therefore retrieves a primary parameter value in response to the scaled signal from the primary sensor.

The memory device (not shown) also includes a plurality of segment numbers included in a look-up table to indicate the number of segments to be illuminated in response to each of the stored parameter values. The instrument 10 thus maps 46 the parameter value to the number of segments to be illuminated on the associated gauge.

In accordance with the preferred embodiment, each of the parameters for which the gauge scaling is affected by a second parameter level includes a plurality of look-up tables for retrieving segment numbers in response to the stored primary parameter values. Typically, each look-up table is associated with a range of the second parameter levels. For example, if the second parameter level is from 0–50, look-up table number one is used, if the second parameter level is from 51–100, look-up table number two is used, etc. Alternatively, a plurality of equations could be developed defining the relationships between the parameter values and the segment commands and could be solved in place of the use of the look-up tables. Similarly, the scaled data could be mapped directly to the segment numbers.

In the preferred embodiment, the high and low warning segments 18,20 and indicating segments 16 are numbered, starting with the most counter-clockwise positioned segment and progressing in the clockwise direction, from 0 through 12. Provided that the sensed parameter is not below the low warning value, neither of the low indicating segments 20 is illuminated. Thus, if the number 7 is retrieved as the number of segments to indicate in the fill-the-graph mode, then segments 2 through 7 are illuminated as shown in FIG. 3*a*. If the number 12 is retrieved as the number of segments to indicate in the fill-the-graph mode and the gauge is a high warning style gauge, then segments 2 through 12 are caused to flash as shown in FIG. 3*b*. If the number 5 is retrieved as the number of segments to indicate in the fill the graph mode and the gauge is a low style warning gauge, then segments 2 through 5 are illuminated as shown in FIG. 3*d*. If the number 0 is retrieved as the number of segments to indicate in the fill-the-graph mode and the gauge is a low style warning gauge, then segments 0 and 1 are caused to flash as shown in FIG. 3*e*. If the gauge is in the single-bar mode, then the segment corresponding to the retrieved number is the only of the warning and indicating segments 16,18,20 that is illuminated or caused to flash.

In keeping with the above example, suppose that the scaled data received from the instrument and associated with the oil pressure in an engine is 179 and that the oil pressure is to be displayed in the low warning format. The instrument would retrieve for example the stored parameter value 100 kPa from a look-up table and responsively retrieve for example the segment number 6 from another look-up table. Segments 2 through 6 would then be illuminated if in the fill-the-graph mode.

If the level of the second sensed parameter changes substantially, a different look-up table is used to convert the parameter value to a segment number. For example, the instrument 10 would retrieve the number 5 instead of the number 6 in response to the parameter value being 100 kPa and segments 2 through 5 would be illuminated. Thus, the level of the second sensed parameter is used to select 42 the gauge scaling.

If the number 0 or 1 is retrieved, the parameter is considered to be below the low warning value, and if the number 11 or 12, the parameter is considered to be above the high warning value. The instrument 10 determines 44 whether the primary parameter level is above or below the high or low warning value, respectively. If the primary parameter level is within the normal operating range, then the gauge 12 is illuminated 48 as described in connection with FIGS. 3*a* and 3*d*. If the primary parameter level is outside the normal operating range, then the gauge 12 is flashed 46 as described in connection with FIGS. 3*b* and 3*e*.

If electromechanical gauges are used in place of the segmented VF gauges, the degree to which the needle is moved by the needle driver is determined similar to the above. Thus the range of values indicated by the gauge is modified in response to changes in the level of the second sensed parameter, including both the normal operating range corresponding to the indicating segments of the VF gauge and the warning range corresponding to the warning segments of the VF gauge.

Figure 5:
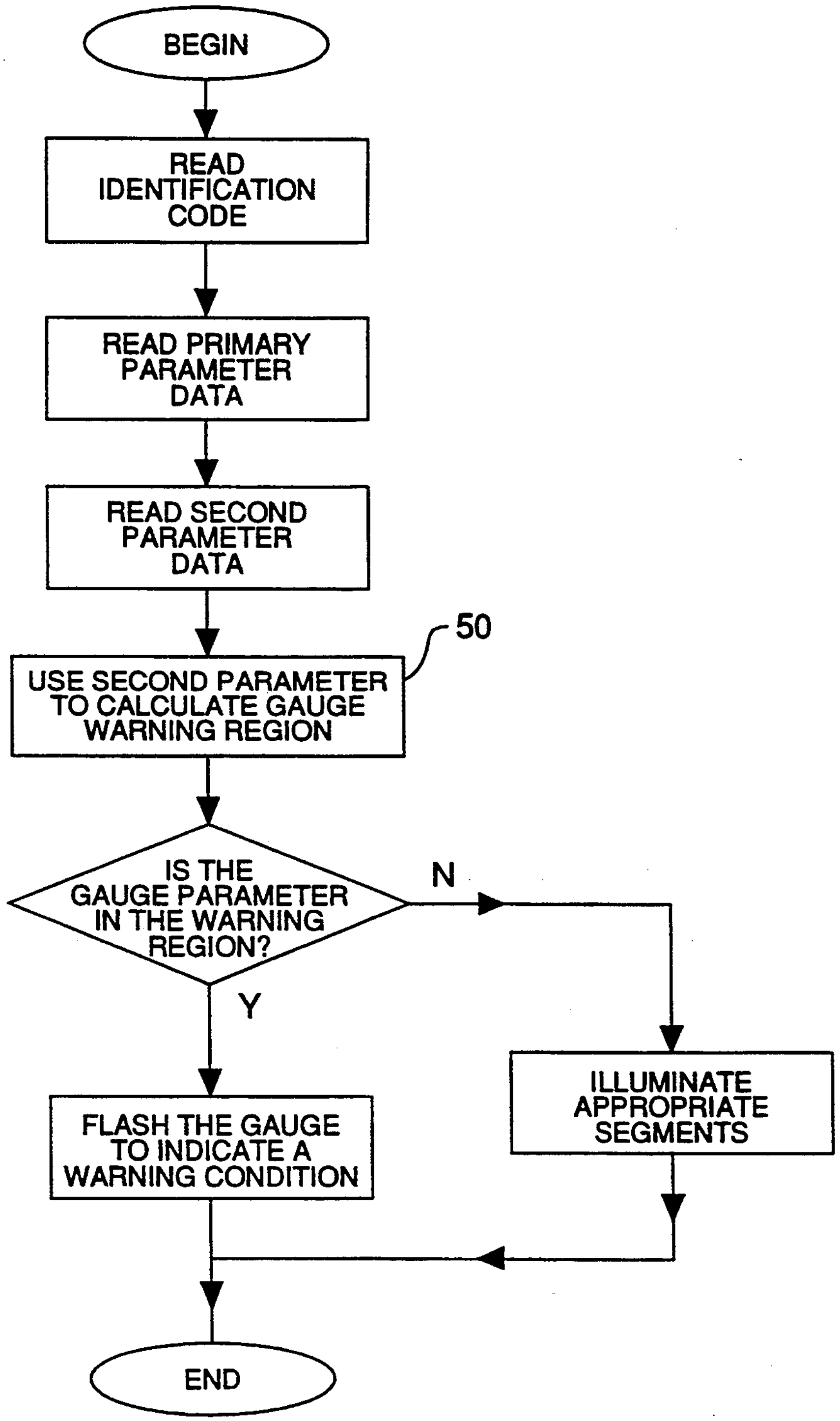
FIG. 5 illustrates a flow chart of an algorithm used in connection with an alternative embodiment of the invention.

In an alternative embodiment, the instrument 10 executes the algorithm shown in FIG. 5. The instrument 10 reads the identification code, primary parameter signal, and second parameter signal as described above. However, rather than changing the gauge scaling, the high or low warning value is changed 50 in response to changes in the level of the second sensed parameter.

In the algorithm shown in FIG. 4, the primary parameter is considered to be above the high warning value when the segment number is 11 or 12 and below the low warning value when the segment number is 0 or 1. In the algorithm shown in FIG. 5, the high and low warning values are changed in response to the level of the second sensed parameter. For example, in the case of oil pressure, the low warning value may be increased in response to an increased engine RPM so that oil pressure is considered to be below the low warning value when the segment number is 0, 1, 2, or 3. The instrument 10 determines whether the primary parameter level is above or below the high or low warning value, respectively. If the primary parameter level is within the normal operating range, then the gauge 12 is illuminated as described in connection with FIGS. 3*a* and 3*d*.

If the primary parameter level is outside the normal operating range, then the gauge 12 is flashed as described in connection with FIGS. 3*c* and 3*f*.

Industrial Applicability

The operation of an embodiment of the present invention is best described in relation to its use in monitoring one of a plurality of parameters on a vehicle. An instrument advantageously has six circular gauges. Four of the six gauges allow the option of displaying one from a choice of two parameters. The parameter being displayed by each gauge is identified by an ISO symbol near the center of the gauge. Gauge usage, the parameter displayed, and the ISO symbol identifying the displayed parameter are defined in software and are vehicle dependent.

In response to an identification code being received via the wire harness, the instrument 10 assigns each of the sensed parameters to a gauge 12. The gauges each include indicating segments forming the middle portion of the gauge with two warning segments at both the top and bottom of the gauge. For each gauge, the high warning segments are enabled if the instrument assigns a parameter to that gauge for which it is desirable to indicate a warning condition when the parameter exceeds a certain level; whereas the low warning segments are enabled if the instrument assign a parameter for which it is desirable to indicate a warning condition when the parameter is below a certain level.

The instrument 10 is programmed so that a normal operating level for each gauge on a given vehicle is close to the center of the gauge. For this reason, in one embodiment, the scaling for each gauge is dependent upon the identity of the primary parameter, the level of the second sensed parameter, and the particular machine to which the instrument 10 is connected.

For example, if engine oil pressure typically increases as engine RPM increases, then the normal operating range for oil pressure is different and higher in response to the increase in engine RPM. The scaling of the gauge is therefore changed in response to engine RPM such that when approximately half of the indicating segments 16 are illuminated, the gauge is indicating that the oil pressure level is in substantially the middle of the normal operating range associated with the current engine RPM level. Similarly, a high or low gauge indication indicates that the primary parameter level is high or low in the normal operating range associated with the current engine RPM level.

In an alternative embodiment, the high and low warning values are changed in response to the level of the second sensed parameter. For example, in the case of oil pressure, the low warning value may be increased in response to an increased engine RPM so that oil pressure is considered to be below the low warning value when the segment number is 0, 1, 2, or 3 rather than only 0 or 1.

The instrument 10 determines whether the primary parameter level is above or below the high or low warning value, respectively. If the primary parameter level is within the normal operating range, then the gauge 12 is illuminated as described in connection with FIGS. 3*a* and 3*d*. If the primary parameter level is outside the normal operating range, then the gauge 12 is flashed as described in connection with FIGS. 3*c* and 3*f* or FIGS. 3*b* and 3*e*.

Any specific values used in the above descriptions should be viewed as exemplary only and not as limitations. Other aspects, objects, and advantages of this invention can be obtained from a study of the drawings, the disclosure, and the appended claims.

We claim:

1. An apparatus for indicating a warning level on a machine having an instrument panel, comprising:
   - gauge means for indicating levels of a primary sensed parameter, said primary sensed parameter having a normal operating range;
   - means for sensing a level of a secondary sensed parameter; and
   - means for modifying the levels of the primary sensed parameter associated with the normal operating range in response to the level of said secondary sensed parameter.

2. An apparatus, as set forth in claim 1, wherein said gauge means includes a normal region for indicating the level of said primary sensed parameter in a normal operating range and a warning region for indicating the level of said primary sensed parameter outside said normal operating range, and said means for modifying the levels encompassed by the normal operating range modifies the range of sensed parameter levels associated with each of said normal and warning regions.

3. An apparatus for indicating a warning level on a vehicle having an instrument panel including a gauge for indicating levels of a primary sensed parameter, said primary sensed parameter having a normal operating range and one of a high or low warning value, comprising:
   - a plurality of indicating segment means being selectively illuminable for indicating the levels of the primary sensed parameter in the normal operating range;
   - one or more warning segment means being selectively illuminable for indicating the level of the primary sensed parameter being outside the normal operating range;
   - means for sensing a level of a secondary sensed parameter;
   - means for modifying the level of the primary sensed parameter corresponding to one of the high or low warning values in response to said level of said secondary sensed parameter.

4. An apparatus, as set forth in claim 3, including warning means for flashing one or more of said warning segment means and less than all of said plurality of indicating segment means in response to the level of the primary sensed parameter being outside the normal operating range.

5. An apparatus, as set forth in claim 4, wherein the gauge includes an outline segment and a symbol and said warning means flashes said outline segment and symbol in response to the level of the primary sensed parameter being outside the normal operating range.

6. An apparatus, as set forth in claim 3, wherein each of said plurality of indicating segment means are associated with a range of primary sensed parameter levels and said means for modifying the levels encompassed by the normal operating range modifies the range of sensed parameter levels associated with each of said plurality of indicating segment means.

7. An apparatus, as set forth in claim 6, wherein the gauge includes an outline segment and a symbol and said warning means flashes said outline segment and symbol in response to the level of the primary sensed parameter being outside the normal operating range.

8. A method for indicating a warning level on a vehicle having an instrument panel, comprising the steps of:

indicating levels of a primary sensed parameter on a gauge having a normal operating range;

sensing a level of a secondary sensed parameter; and modifying the levels of the primary sensed parameter associated with the normal operating range of the gauge in response to the level of the secondary sensed parameter.

9. A method, as set forth in claim 8, wherein the level of said primary sensed parameter is indicated on the gauge in one of a normal region and a warning region and wherein said step of modifying the levels encompassed by the normal operating range includes the step of modifying the range of sensed parameter levels associated with each of said normal and warning regions of the gauge.

10. A method, as set forth in claim 8, including the step of flashing one or more warning segments and less than all of a plurality of indicating segments in response to the level of the primary sensed parameter being outside the normal operating range.

* * * * *